United States Patent [19]

Seto

[11] Patent Number: 4,592,647
[45] Date of Patent: Jun. 3, 1986

[54] AUTO-FOCUS SETTING METHOD AND APPARATUS FOR PRINTING SLIDE FILMS

[75] Inventor: Yasuhiro Seto, Kaisei, Japan

[73] Assignee: Fuji Photo Film Co., Ltd., Kanagawa, Japan

[21] Appl. No.: 618,406

[22] Filed: Jun. 6, 1984

[30] Foreign Application Priority Data

Jun. 15, 1983 [JP] Japan .................. 58-107451

[51] Int. Cl.⁴ ............................. G03B 27/52
[52] U.S. Cl. .......................... 355/40; 355/55; 355/77
[58] Field of Search .......... 355/40, 75, 64, 44, 355/45, 55, 56, 57, 18, 27-29; 353/101, 104, 122; 269/234, 242

[56] References Cited

U.S. PATENT DOCUMENTS 4,208,045 6/1980 Rowe et al. .................. 269/234 X

OTHER PUBLICATIONS

Fuji, Automatic Printer FAP3500H.
Fuji, Automatic Printer 8C6910; Dec. 3, 1980, 2 pages.
Fuji, Color Roll Printers 8C6910II and 5C6910.

Primary Examiner—Russell E. Adams
Assistant Examiner—Della Rutledge
Attorney, Agent, or Firm—Wenderoth, Lind & Ponack

[57] ABSTRACT

An improved auto-focus setting operation of a slide film in a printing system can be carried out by preliminarily measuring auto-focus information before the slide film is fed to a printing position in the printing system. An auto-focus mechanism assembled in the printing system is operated in accordance with the auto-focus information for preliminarily setting a slide film setting member to a focus position of the slide film.

4 Claims, 3 Drawing Figures

AUTO-FOCUS SETTING METHOD AND APPARATUS FOR PRINTING SLIDE FILMS

BACKGROUND OF THE INVENTION

1. Field of the Invention

This invention relates to an auto-focus setting method and apparatus for printing slide films in a printing system.

2. Description of the Prior Art

In a conventional printing system for printing slide films (or mounted films), provided with an Af (Auto-Focus) mechanism, AF information representing an amount of a vertical shift of a printing table on which a slide film is set for a printing operation for focus adjustment of an image of the slide film is measured in the printing system and the printing operation is performed by the operation of the AF mechanism in response to the AF information. In such a printing system as described above, the AF information must be obtained during the time when the slide film introduced into the printing system is subjected to the printing operation and the adjustment of arrangement of the AF mechanism in response to the AF information must be done in the printing system. These procedures take much time to print the slide film and reduce the operational efficiencies.

SUMMARY OF THE INVENTION

An object of this invention is to obviate the defects of the prior art described above and to provide an auto-focus setting method and apparatus for printing slide films in which the AF informationis obtained before the slide film is introduced into the printing system and the AF mechanism is also adjusted in accordance with the AF information before the slide film is covered to the printing position.

According to this invention, in one aspect, there is provided an auto-focus setting method for printing a slide film in a printing system of the type in which the slide film is shifted to a film printing position at which the slide film is focused on a focus position of a lens system by an auto-focus mechanism. The method is characterized by comprising the steps of measuring auto-focus information before the slide film is introduced into the printing system, operating the auto-focus mechanism in response to the measured auto-focus information, and performing printing operation of the slide film at a focus position of the slide film when the slide film reaches the printing position in the printing system.

In another aspect of this invention, there is provided an apparatus for carrying out the auto-focus setting method described above. The apparatus generally comprises a slide film setting member located below a printing member containing a photographic printing paper, a conveyor for conveying the slide film to the slide film setting member, and an auto-focus mechanism operatively connected to the slide film setting member. In the apparatus, the auto-focus mechanism is located directly below the slide film setting member and comprises a frame, a pulse motor which is operated in accordance with auto-focus information from a control device located externally of the printing system, a rotating shaft driven by the pulse motor and journaled at both ends by the frame, the shaft being provided with external right-handed and left-handed screw threads symmetric with respect to the central portion of the shaft, and a pair of slide blocks provided respectively with bores having internal screw threads corresponding to the right-handed and left-handed screw threads of the rotating shaft when meshed, the lower surfaces of the slide blocks being slidably engaged with the upper surface of the bottom wall of the frame and the upper surfaces of the slide blocks having inclinations corresponding to the inclination of the lower surface of the slide film setting member.

According to this invention, an auto-focus setting operation can be done by operating the AF mechanism in the printing system during the time when the slide film is fed to the film setting position in the printing system, so that the slide film reaches the printing position can promptly be subjected to the printing operation without any time loss.

DETAILED DESCRIPTION OF THE PREFERRED EMBODIMENT

Figure 1:
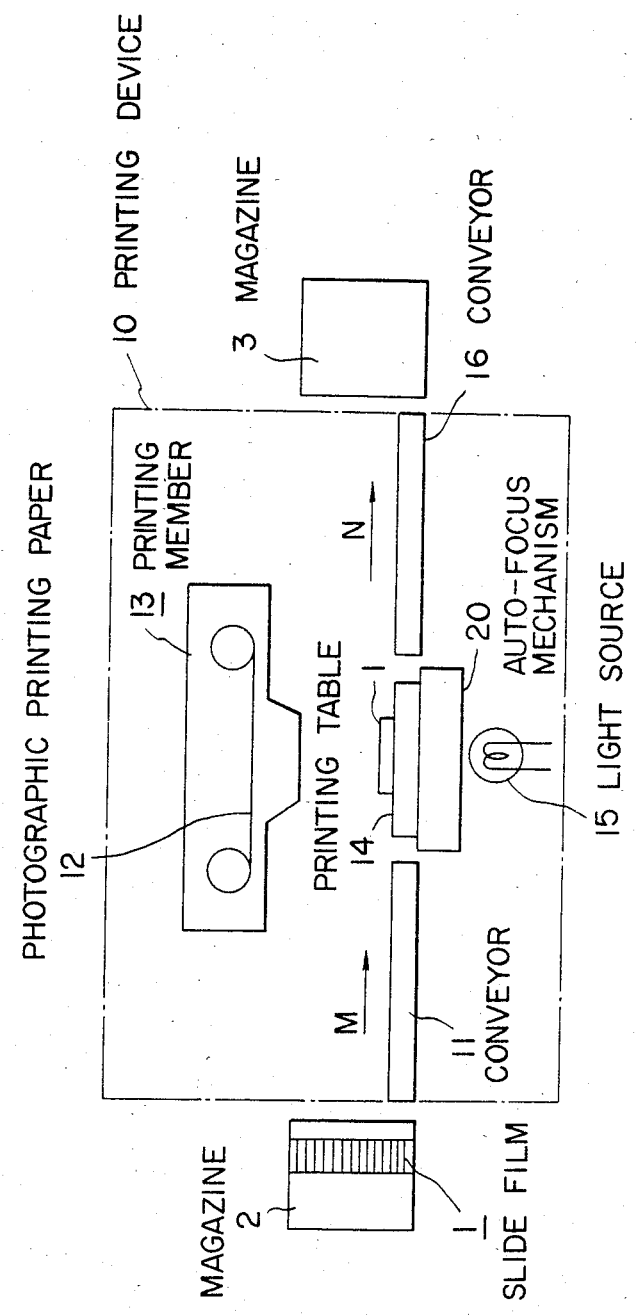
FIG. 1 is a schematic diagram showing a printing system to which the present invention is applied.

FIG. 1 is a brief diagram showing a printing system to which a method of this invention can be applied, wherein a magazine 2 in which a plurality of slide films 1 are vertically stacked is attached to a predetermined position of a printing device 10 so that the slide films 1 are fed one by one into the printing device 10 towards another magazine 3 attached to another position of the printing device 10 after the film 1 has been printed by the printing devide 10.

The printing device 10 generally comprises a conveyor 11 for taking out one slide film 1 from the magazine 2 and conveying the film 1 in a direction M, a printing member 13 for printing an image of the slide film 1 on a rolled photographic printing paper 12, a printing table 14, i.e. slide film setting member, located below the printing member 13 for setting a position of the slide film 1 and focusing the image thereof at a printing time, an auto-focus mechanism 20 (AF mechanism, called hereinafter) mounted on the lower surface of the printing table 14 for vertically moving the printing table 14 to the focus position, a light source 15 disposed directly below the printing table 14 and the AF mechanism 20, and a conveyor 16 for conveying the slide film 1 after the printing operation in a direction N towards the magazine 3. AF information of each of the slide films 1 is preliminarily measured or detected by an optical system, schematically shown in FIGS. 2 and 3, before the films 1 are stacked in the magazine 2 and the AF information is stored by the magazine 2 or a memory, not shown. The stored AF information is transferred from the memory in response to the takeout operation of the slide film 1 for the printing device 10.

With the construction of the printing device 10 described above, the slide film 1 taken out from the magazine 2 is conveyed through the conveyor 11 in the direction M on the printing table 14. When the slide film 1, the AF information of which is preliminarily measured or detected, is introduced into the printing device 10, the AF information corresponding to the introduced slide film 1 is transferred to the printing device 10 from the memory, not shown, located externally of the printing device 10. Therefore, the AF mechanism 20 operates so as to preliminarily move vertically the printing table 14 in accordance with the transferred AF information corresponding to the introduced slide film 1, and accordingly, when the slide film 1 is conveyed to the printing table 14, the printing table 14 is already positioned to the focus position of the conveyed slide film 1. Thus, the printing operation without extra time loss due to the focusing operation can be done speedily by the printing member 13 when the slide film 1 is conveyed on the printing table 14. The slide film 1 on the printing table 14 is subjected to the positional adjustment and is printed by the light from the light source 15 with an exposure amount operated by an exposure control circuit. After the printing of the slide film 1 on the photographic printing paper 12, the slide film 1 is conveyed by the conveyor 16 to the magazine 3 to store it therein.

Figure 2:
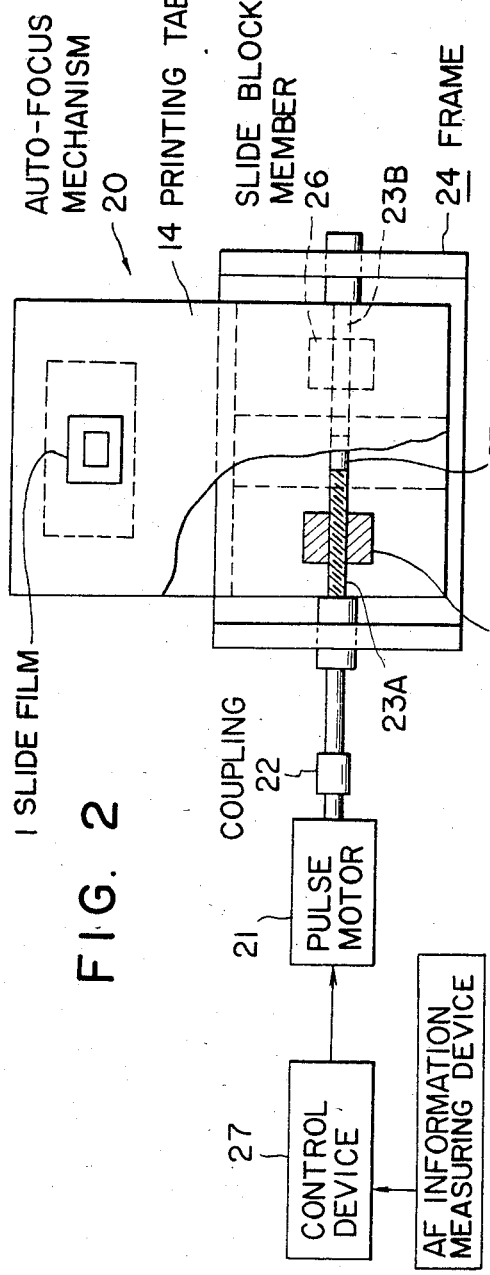
FIG. 2 is a plan view, partially in section of an auto-focus mechanism to be applied to the printing system shown in FIG. 1 according to this invention.
Figure 3:
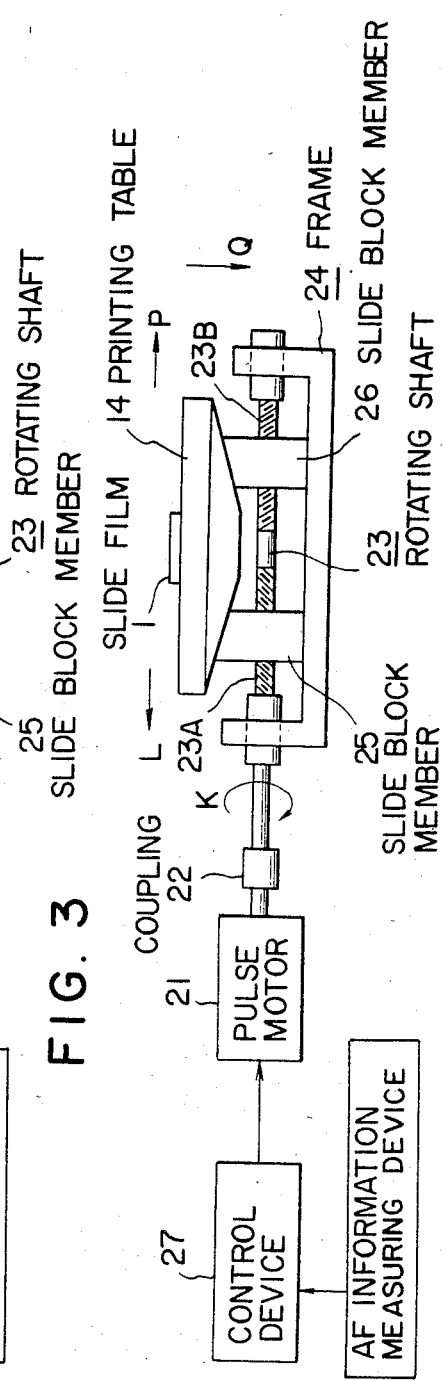
FIG. 3 is a side view of the auto-focus mechanism shown in FIG. 2.

The AF mechanism 20 according to this ivention has a construction shown in FIGS. 2 and 3, in which a pulse motor 21 as a driving source is provided with a rotating shaft 23 through a coupling 22. The pulse motor 21 is driven by a control device 27 which receives AF information from the optical system. The shaft 23 has two ends journaled by a frame 24 and is provided with threaded shaft portions 23A and 23B symmetric with respect to the central portion of the shaft 23. The shaft portion 23A is provided with external right-handed screw threads (or left-handed screw threads) and the shaft portion 23B is provided with external left-handed screw threads (or right-handed screw threads). Slide block members 25 and 26 are provided with bores having internal threads corresponding to the screw threads of the shaft portions 23A and 23B, respectively. As shown in FIG. 3, in the meshed condition with shaft portions 23A and 23B, the slide blocks 25 and 26 have bottom surfaces slidable on the upper surface of the bottom wall of the frame 24 and upper surfaces having inclinations corresponding to the inclination of the lower surface of printing table 14. As shown in FIG. 2, the printing table 14 has a rectangular longitudinal section, and the slide film 1 is conveyed and rested on the upper surface thereof. The light source 15 is located directly below the rested portion of the film 1 and the printing operation can be done by the light therefrom in the printing member 13.

The AF mechanism 20 will operate as follows. When information (AF information) representing the amount of vertical movement of the printing table for focusing adjustment of the image of the slide film 1 is transferred from the control device 27 located externally to the pulse motor 21, the pulse motor 21 is driven to thereby rotate the shaft 23, for example, in a direction K to move the printing table 14 in a direction Q for lowering the same. At this time, the slide block 25 is shifted in a direction L in mesh with the right-handed screw threads 23A of the rotating shaft 23 and the slide block 26 is simultaneously shifted in a direction P in mesh with the left-handed screw threads 23B of the rotating shaft 23 with the same shifted distances. As the result, the distance between the slide blocks 25 and 26 is widened and the printing table 14 is accordingly lowered in the direction Q along the inclined upper surfaces of the slide blocks 25 and 26. On the other hand, the rotation of the rotating shaft 23 in a direction reverse to the direction K narrows the distance between the slide blocks 25 and 26 to thereby raise the printing table 14 in response to AF information sent from the control device 27 to the pulse motor 21.

In the aforementioned embodiment, although the AF information is measured by an optical system located externally of the printing system before the slide films 1 are set in the magazine 2, the measurement of the AF information may be made when the slide film 1 is fed from the magazine 2 to the conveyor 11 or when the slide film 1 on the conveyor 11 waits for the next printing operation on the printing table 14. In other words, it is allowed for the AF information to be measured before the slide film 1 has reached the printing table 14 for the printing operation. Since mounts to which slide films 1 are fitted have different thicknesses according to makers for producing the mounts for the films, but within the thickness of about 1.2–3.2 mm, alternatively, a code number (No.) representing the type of a slide film 1 may preliminarily be given to the printing member 13 without optically measuring the position of the slide film 1. In another embodiment, the thickness of the mount to be used may be utilized instead of the AF information by preliminarily measuring the thickness of the slide film 1 by a known mechanical or optical device.

What is claimed is:

1. An auto-focus setting method for printing a slide film in a printing system in which the slide film is shifted to a film printing position at which the slide film is focused on the focus position of a lens system by an auto-focus mechanism, comprising the steps of:
   measuring auto-focus information before the slide film is introduced into the printing system;
   operating the auto-focus mechanism in response to the meausured auto-focus information; and
   performing a printing operation of the slide film at a focus position of the slide film when the slide film reaches the printing position in the printing system.

2. The auto-focus setting method as claimed in claim 1 wherein said step of the measuring is performed at a time when the slide film is fed from a magazine to a conveyor.

3. The auto-focus setting method as claimed in claim 1 wherein said step of the measuring is performed when the slide film on a conveyor waits for a next printing operation.

4. An auto-focus setting appatatus for printing a slide film in a printing system of the type in which the slide film is shifted to a film printing position at which the slide film is focused on a focus position of a lens system in a printing member, comprising:
   a slide film setting member located below the printing member containing photographic printing paper, said slide film setting member having a lower surface with an inclination;
   a conveyor means for conveyingthe slide film to said slide film setting member; and
   an auto-focus mechanism operatively connected to said slide film setting member, said auto-focus mechanism being located directly below said slide film setting member and comprising:
      a frame having a bottom wall with an upper surface,
      a pulse motor which is operated in accordance with auto-focus information,
      means, located externally of the printing system, for measuring auto-focus information, a control means, located externally of the printing system, for feeding auto-focus information to the pulse motor, a rotating shaft driven by said pulse motor and journaled at both ends by said frame, said shaft being provided with a central portion, external right-handed and left-handed screw threads provided symmetric with respect to the central portion of said shaft, and a pair of slide blocks provided respectively with bores having internal screw threads corresponding to said right-handed and left-handed screw threads of said rotating shaft when meshed, lower surfaces of said slide blocks being slidably engaged with the upper surface of the bottom wall of said frame and upper surfaces of said slide blocks having inclinations corresponding to the inclination of the lower surface of said slide film setting member.

* * * * *